United States Patent [19]

Yoon

[11] Patent Number: 5,303,162
[45] Date of Patent: Apr. 12, 1994

[54] SYSTEM FOR AUTOMATICALLY MEASURING PILING RESULTS IN A PILING OPERATION

[75] Inventor: Myung Oh Yoon, Seoul, Rep. of Korea

[73] Assignee: Korea National Housing Corporation, Rep. of Korea

[21] Appl. No.: 790,341

[22] Filed: Nov. 12, 1991

[30] Foreign Application Priority Data

Oct. 7, 1991 [KR] Rep. of Korea ............... 17545/1991

[51] Int. Cl.[5] ............................................. G01B 7/26
[52] U.S. Cl. .............................. 364/550; 364/551.01; 364/506; 173/2; 173/20; 73/11.03
[58] Field of Search ................... 364/550, 551.01, 506, 364/559, 560, 561; 73/11.01–11.03, 12.01, 609, 304 R, 304 C, 290 R; 33/366, 367, 711, 772, 773, 778, 779, 377, 775, 777; 173/2, 21, 113, 20

[56] References Cited

U.S. PATENT DOCUMENTS

| | | | |
|---|---|---|---|
| 2,099,794 | 11/1937 | Bonney et al. | 33/375 |
| 3,118,088 | 1/1964 | Hanson | 361/159 |
| 3,654,554 | 11/1967 | Panerai et al. | 33/366 |
| 4,085,515 | 4/1978 | Darden | 33/377 |
| 4,365,306 | 12/1982 | House et al. | 364/551 |
| 4,377,850 | 3/1983 | Simpson | 364/561 |
| 4,457,071 | 6/1984 | Alphonso | 33/134 R |
| 4,542,795 | 9/1985 | Yoshimura | 173/2 |
| 4,817,733 | 4/1989 | Hennecke et al. | 173/2 |
| 4,940,965 | 6/1990 | Umehara | 340/460 |
| 5,142,909 | 9/1992 | Baughman | 73/304 C |

Primary Examiner—Jack B. Harvey
Assistant Examiner—Jae H. Choi
Attorney, Agent, or Firm—Scully, Scott, Murphy & Presser

[57] ABSTRACT

A system for automatically measuring piling results of a piling operation. The system comprises a pile numbering unit, an operational date setting unit, a reference sinking amount setting unit, an average times of hammering setting unit, a stop signal generating unit, a start signal generating unit, a pile sinking displacement measuring unit, a pile perpendicularity detecting unit, a hammering sound detecting unit, a central processing unit, a data printer, a signal display, an informing speaker, a pile perpendicularity display, and a measuring arm for mounting the pile sinking displacement measuring unit and the pile perpendicularity detecting unit. The system of this invention provides an advantage in that it carries out the piling operation without an error, and needs no piling operator for controlling the piling operation, resulting in curtailment of personnel expenditures, efficiently preventing a safety accident, and another advantage in that the results of the piling operation are stored in an electronic circuit which can not be fabricated, and printed by a printer, thereby accomplishing an automatic superintendence for the piling operation. The system of this invention can visually display the perpendicularity of the pile in order to provide an easy and exact observation of the perpendicularity of the pile.

6 Claims, 11 Drawing Sheets

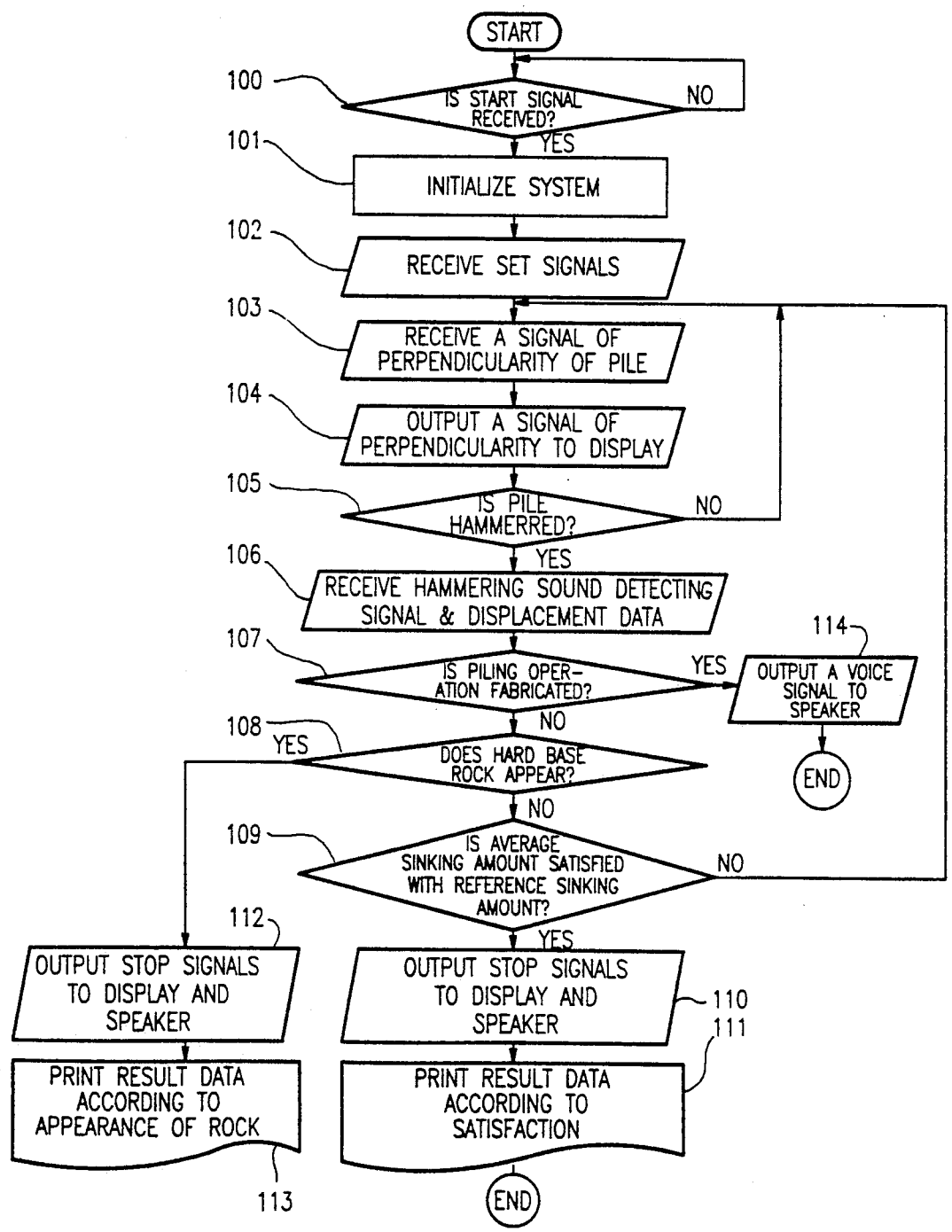

SYSTEM FOR AUTOMATICALLY MEASURING PILING RESULTS IN A PILING OPERATION

BACKGROUND OF THE INVENTION

1. Field of the Invention

The present invention relates to a system for controlling a piling operation performed by a piling machine, and more particularly to a system for automatically controlling a piling operation by which piling results are automatically measured at every hammering action, displayed by means of a display in order to inform the operator of the piling results and printed by means of a printer in order to leave operational data corresponding to the piling results.

2. Description of the Prior Art

In conventional piling operation, the piling results, such as piling depth, perpendicularity of a pile and the like, have been generally measured by virtue of an eye-measurement and an experience of the operator.

Especially for determining whether the pile is inserted into the ground to a desired depth, a wooden scale is mounted on the pile in order to allow the operator to put a mark thereon with a pen at every hammering action of the piling machine. In result, the operator has to continuously measure the marks with his eyes and experience in order to measure the piling depth at every hammering action until the pile is inserted into the ground to the desired depth, thereby making it possible to determine a point of time when the piling operation has to be stopped.

However, the known measuring method has several disadvantages in that the piling operational data representing the piling depth can not often remain due to gradual burying of the marks put on the wooden scale as the pile is gradually inserted into the ground by the piling machine. Even if the marks on the wooden scale are not buried, it may be possible to occur an error in writing, on the basis of the marks, the piling depth on a piling recorder. In addition, the writing of the piling depth on the piling recorder may cause a fabrication, and the marks on the wooden scale may be gradually erased as time goes by, thereby causing a disadvantage of unreliability in the measurement data. Also, the wooden scale mounted on the pile may cause a relative unstableness thereof with respect to the pile so that the scale often relatively moves with respect to the pile as the pile is inserted into the ground by hammering of the piling machine. In result, the known measuring method has a disadvantage in that the wooden scale can not efficiently functions as absolute coordinates owing to the relative movement of the wooden scale, thereby causing the displacement data of the piling operation, resulting from being measured on the piling operation, resulting from being measured on the basis of the scale, not to be recognized to have a reliability.

Furthermore, the known method for measuring the piling results does need an auxiliary worker such as a piling control operator who generally works closely near the pile in order to efficiently observe the marks on the wooden scale, thereby causing a safety accident to occur and the personnel expenditure to considerably increase.

On the other hand, the piling operation needs to be measured in the perpendicularity of the pile in order to secure the pile to be vertically inserted into the ground. A known method for measuring the perpendicularity of the pile is generally performed by using a balance weight. The balance weight is vertically suspended to the wooden scale by a thread so that the thread will parallel with the vertical scale in case that the pile is vertically inserted. In result, the balance weight allows the operator to determine by his eye-measurement whether the pile is vertically inserted into the ground.

However, the known method for measuring the perpendicularity of the pile can not secure a reliability in the measurement as the measurement is carried out by the operator's eyes. Also, it is impossible to write the measuring results on the piling recorder, thereby causing a superintendence for determining whether the piling operation has been exactly carried out in accordance with the rules not to be practicable. In addition, the known method generally uses only one balance weight so that, if the pile leans to a side of the balance weight, the thread looks like as if it parallels with the wooden scale. Hence, the known method has a disadvantage in that the operator may erroneously determine that the pile is vertically inserted even though it leans to the side of the weight. In the known method for measuring the perpendicularity, the piling control operator always works closely near the pile in order to exactly observe the parallelism between the thread and the pile so as to determine the perpendicularity of the pile, thereby causing a safety accident to occur.

SUMMARY OF THE INVENTION

It is, therefore, an object of this invention to provide a system for automatically measuring operational results of a piling operation by which the above-mentioned disadvantages can be overcome, and in which displacement and perpendicularity of a pile are automatically and exactly measured and displayed by means of a signal display.

It is another object of this invention to provide a system for automatically measuring operational results of a piling operation which automatically and exactly informs the operator of a point of time of stopping the piling operation when the pile has been inserted into the ground to an extent at which extent it is accomplished a desired displacement of the pile previously set according to a reference sinking amount and an average times of hammering.

It is still another object of this invention to provide a system for automatically measuring operational results of a piling operation in which operational results of the piling operation are efficiently stored in an electronic circuit which can not be fabricated, and printed by a printer, thereby accomplishing an automatic superintendence for the piling operation without possibility of fabrication in the operational results.

It is still another object of this invention to provide a system for automatically measuring operational results of a piling operation which needs no piling control operator for controlling the piling operation, thereby resulting in curtailment of personnel expenditures and prevention of a safety accident due to the manual measurement.

It is still another object of this invention to provide a system for automatically measuring operational results of a piling operation in which a signal corresponding to the perpendicularity of the pile is visually displayed by means of a display during the piling operation, thereby allowing the operator to easily and exactly determine whether the perpendicularity of the pile is secured.

In one aspect, the present invention provides a system for automatically measuring piling results of a piling operation comprising a pile numbering unit for numbering a pile; an operational date setting unit for setting a date when the piling operation is carried out; a reference sinking amount setting unit for setting a reference sinking amount of the pile; an average times of hammering setting unit for setting average times of hammering by a piling machine; a stop signal generating unit for generating a stop signal; a start signal generating unit for generating a start signal; a pile sinking displacement measuring unit for measuring a sinking displacement amount of the pile, the unit being operatively coupled with the pile; a pile perpendicularity detecting unit for detecting perpendicularity of the pile; a hammering sound detecting unit for detecting a hammering sound; a central processing unit electrically connected to the units in order to receive and process the signals from the units, thereby controlling the system; a data printer for printing an operational data upon receiving data signals applied from the CPU thereto; a signal display for displaying respective visual signals such as a waiting signal, a working signal and a stop signal upon receiving a control signal outputted from the CPU thereto; an informing speaker for informing the operator of information upon receiving an information signal from the CPU; a pile perpendicularity display for displaying perpendicularity of the pile upon receiving a perpendicularity signal applied from the CPU; and a measuring arm for mounting said pile sinking displacement measuring unit and the pile perpendicularity detecting unit.

In other aspect, the present invention provides a method for automatically measuring piling results of a piling operation by using the measuring system of the above-mentioned construction, the method comprising the steps of: upon receiving a start signal from the start signal generating unit, initializing variables of the system; upon receiving respective signals corresponding to a pile number, an operational date, a reference sinking amount, an average times of hammering, and a signal corresponding to perpendicularity of the pile, outputting a display signal to the perpendicularity display; upon receiving a displacement detecting signal outputted from the piling displacement detecting unit, determining whether the pile has been hammered by a piling machine in order to be inserted into the ground; if the pile has not been hammered by the piling machine, returning to the step of receiving the signal corresponding to perpendicularity of the pile; if the pile has been hammered by the piling machine, determining whether a hammering sound detecting signal has been received and also a displacement detecting signal shows a displacement of the pile at the same time, that is determining whether the piling operation has been optionally fabricated; if the piling operation has been optionally fabricated, outputting a voice signal, representing that the piling operation has been optionally fabricated, to the informing speaker in order to generate an alarm voice, while if the piling operation has not been fabricated, determining on the basis of the displacement detecting signal whether a hard base rock appeared; if the hard base rock appeared, outputting a signal to the signal display in order to display a stop signal, and outputting a voice signal to the informing speaker in order to inform appearance of the hard base rock and also outputting result data according to the appearance of the hard base rock to the printer in order to print the result data; if a hard base rock does not appear, determining whether the piling operation satisfies an operation according to a set reference sinking amount and a set average times of hammering, that is determining whether an average sinking amount of the pile satisfies a reference sinking amount; if the average sinking amount does not satisfy the reference sinking amount, returning to the step of receiving the perpendicularity detecting signals, while if the average sinking amount satisfies the reference sinking amount, outputting a control signal to the signal display in order to display a stop signal, and outputting a voice signal to the speaker in order to generate a voice representing the stop signal, and also outputting result data according to the satisfaction to the printer in order to print the result data; and upon receiving a stop signal from the stop signal generator, outputting a non-maskable interrupt signal, and outputting a stop signal to the signal display in order to display the stop of the piling operation, and outputting a voice signal to the speaker in order to generate a voice representing the stop of the piling operation, then outputting result data according to a manual stop of the piling operation to the printer in order to print the result data.

BRIEF DESCRIPTION OF THE DRAWINGS

The above and other objects, features and other advantages of the present invention will be more clearly understood from the following detailed description taken in conjunction with the accompanying drawings, in which:

FIGS. 2A to 2C are views showing a measuring arm of this invention, in which:

FIG. 2A is a bottom view of an upper part of the arm for showing an under-construction thereof;

FIG. 2B is an elevational front view of the arm which is mounted on a pile; and

FIG. 2C is a schematic plane view for showing how the arm is mounted to the pile;

FIG. 7 is a flowchart showing a control process for automatically measuring operational results of the piling operation in accordance with this invention; and FIGS. 8A, 8B and 9 each shows a flowchart of a sub-routine of the process of FIG. 7, in which;

FIG. 8A is a flowchart of a sub-routine for determining whether the piling machine hammered the pile in order to insert it into the ground;

FIG. 8B is a flowchart of a sub-routine for determining whether a hard base rock appeared; and FIG. 9 is a flowchart of sub-routine for manually stopping the operation.

DETAILED DESCRIPTION OF THE PREFERRED EMBODIMENTS

Figure 1:
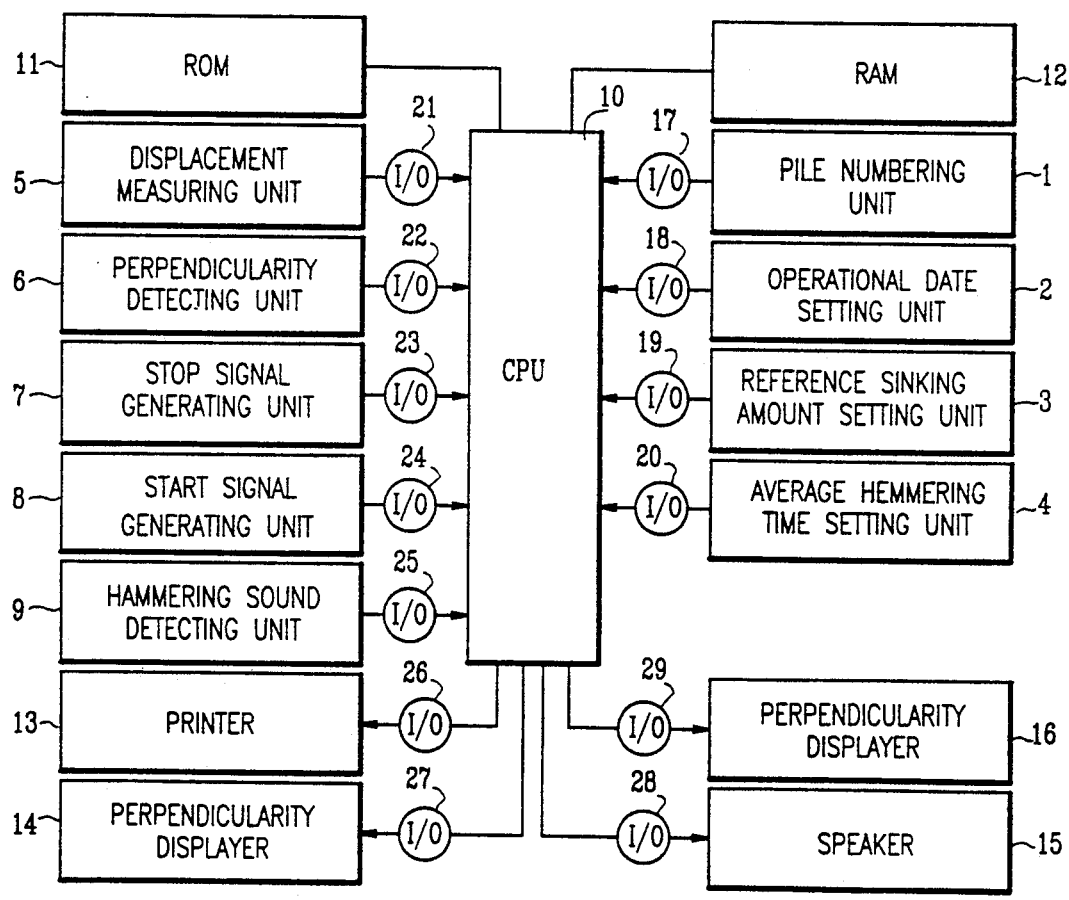
FIG. 1 is a block diagram showing a construction of a measuring system of this invention.

Referring now to FIG. 1 which is a block diagram showing a construction of a measuring system of this invention, the system comprises a central processing unit 10 (hereinafter, referred to simply as "the CPU"), a plurality of input parts 1 to 9 electrically connected to the CPU 10 in order to output respective signals to CPU 10, and a plurality of output parts 13 to 16 electrically connected to the CPU 10 in order to respective output signals from the CPU 10. In addition, the input parts 1 to 9 of the system are electrically connected to the CPU 10 by way of a plurality of input/output units 17 to 25, respectively, and comprise a pile numbering unit 1 for numbering piles one by one, an operational date setting unit 2 for setting a date of piling operation, a reference sinking amount setting unit 3 for setting a reference sinking amount of the pile, an average times of hammering setting unit 4 for setting average times of hammering in a piling operation, a pile sinking displacement measuring unit 5, which is mounted on the sinking pile in order to be operatively coupled therewith, for measuring a sinking displacement of the pile, a piling perpendicularity detecting unit 6 for detecting perpendicularity of the pile, a stop signal generating unit 7 for generating a stop signal, a starting signal generating unit 8 for generating a start signal, a hammering sound detecting unit 9 for detecting a hammering sound.

While, the output parts 13 to 16 of the system are electrically connected to the CPU 10 by way of a plurality of input/output units 26 to 29, respectively. In order words, the output units 13 to 16 of the system comprise a data printer 13 for printing the operational data upon receiving data signals applied from the CPU 10 thereto by way of an input/output unit 26, a signal display 14 for displaying respective visual signals such as a waiting signal, a start signal, a working signal, a stop signal and the like upon receiving a control signal outputted from the CPU 10 thereto by way of an input/output unit 27, an informing speaker 15 for informing the operator of information upon receiving an information signal from the CPU 10 by way of an input/output unit 28, and a perpendicularity display 16 for displaying whether the perpendicularity of the pile is secured or not upon receiving a signal corresponding to perpendicularity of the pile applied from the CPU 10 thereto by way of an input/output unit 29.

Therefore upon receiving input signals from the input parts 1 to 9 by way of the input/output units 17 to 25, the CPU 10 processes the input signals by using a software programmed therein, and then outputs control signals to respective output parts 13 to 16 by way of the input/output units 26 to 29 in order to make the output parts 13 to 16 carry out specific functions thereof.

In FIG. 1, the reference numerals 11 and 12 denote a ROM for programming the software and a RAM for storing result data having been processed by the CPU 10, respectively.

Figure 2A:
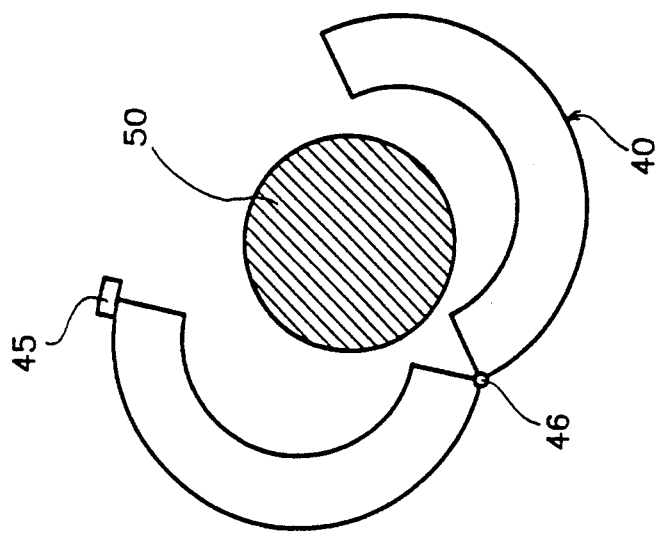
Figure 2B:
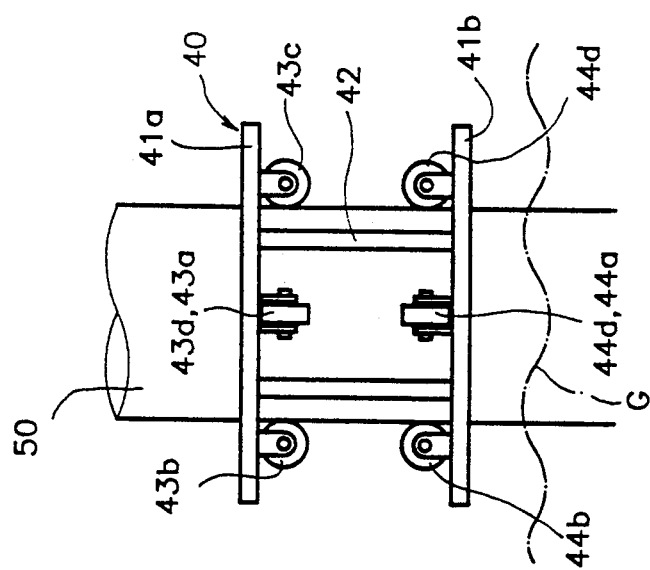
Figure 2C:
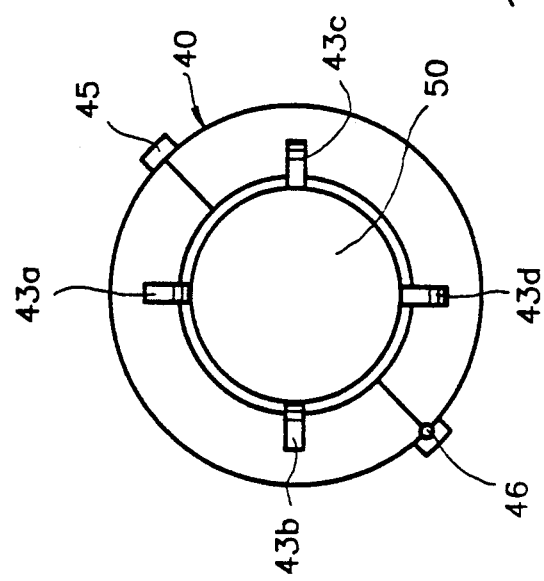

FIGS. 2A to 2C are views showing a measuring arm 40 with which the piling displacement detecting unit 5 and the piling perpendicularity detecting unit 6 shown in FIG. 1 whill be equipped, in which FIG. 2A is a bottom view of an upper part of the arm 40 for showing an under-construction thereof, and FIG. 2B is an elevational front view of the arm 40 which is mounted on a pile 50, and FIG. 2C is a schematic plane view for showing how the arm 40 is mounted to the pile 50. As described in the drawings, the measuring arm 40 comprises two parts, upper and lower parts 41a and 41b, which are connected to each other by means of a plurality of vertical columns 42 fixedly mounted thereto in order to be disposed therebetween, thereby securing a parallelism between the two parts 41a and 41b and providing a vertical space therebetween. The upper part 41a of the arm 40 is provided with a plurality of rollers 43a to 43d disposed thereunder. The rollers 43a to 43d are disposed in order to secure a space therebetween, and each closely contacts with an outer surface of the pile 50 as the arm 40 is mounted to the pile 50. In the same manner, the lower part 41b is provided thereon with a plurality of rollers 44a to 44d. Thus, the pile 50 smoothly moves in a vertical direction under the condition of close contact with the rollers 43a to 43d and 44a to 44d as it downwardly moves due to hammering of a piling machine. As shown in FIG. 2C, the part 41a, 41b comprises two arc-shaped pieces which are connected to each other by means of a hinged connection 46. Additionally, one of the pieces of the part 41a, 41b is provided at its free end with a clamp 45 for clamping the two pieces of the arm 40 into a body when the arm 40 is mounted to the pile 50 as described in FIG. 2C.

In FIG. 2B, the letter G denotes a ground surface at which the pile 50 is piled.

Figure 3A:
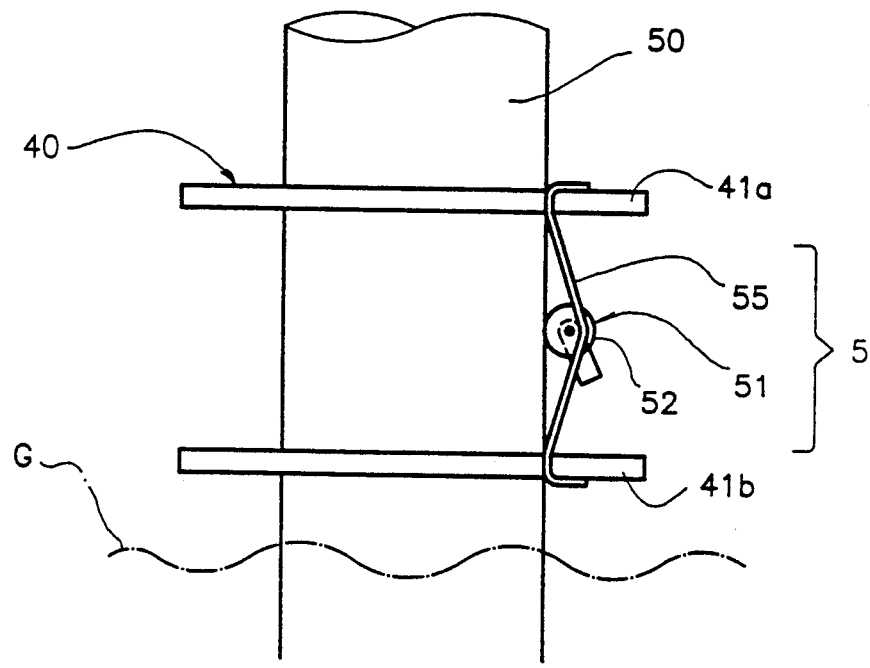
FIG. 3A is a schematic front view of the pile provided with the measuring arm of FIGS. 2A to 2C, on which arm a piling displacement detecting unit is mounted.
Figure 3B:
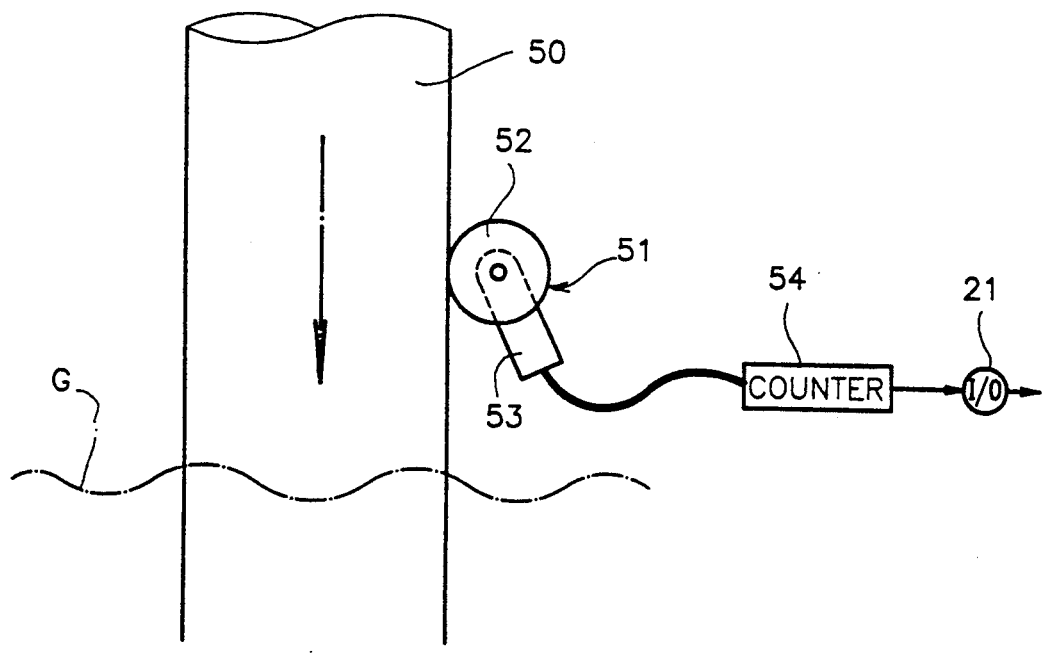
FIG. 3B is a schematic front view showing a displacement detection carried out by the displacement detecting unit of FIG. 1 as the pile is inserted into the ground by means of a piling machine.

In addition, FIG. 3A is a schematic front view of the pile 50 provided with the measuring arm 40 on which the piling displacement detecting unit 5 is mounted, and FIG. 3B is a schematic front view showing a displacement detection carried out by the displacement detecting unit 5 when the pile 50 is inserted into the ground by means of the piling machine. As shown in the drawings, the displacement detecting unit 5 comprises a rotary encoder 51 mounted on the arm 40 between the upper and lower parts 41a and 41b such that an elastic rubber plate 55 is elastically disposed between the upper and lower parts 41a and 41b in order to elastically and radially support a roller 52 of the rotary encoder 51, thereby allowing the roller 52 to closely and elastically contact with the outer surface of the pile 50. On the other hand, a detecting part 53 of the encoder 51 is, as shown in FIG. 3B, electrically connected to the CPU 10 by way of the input/output unit 21 and a counter 54.

Figure 4A:
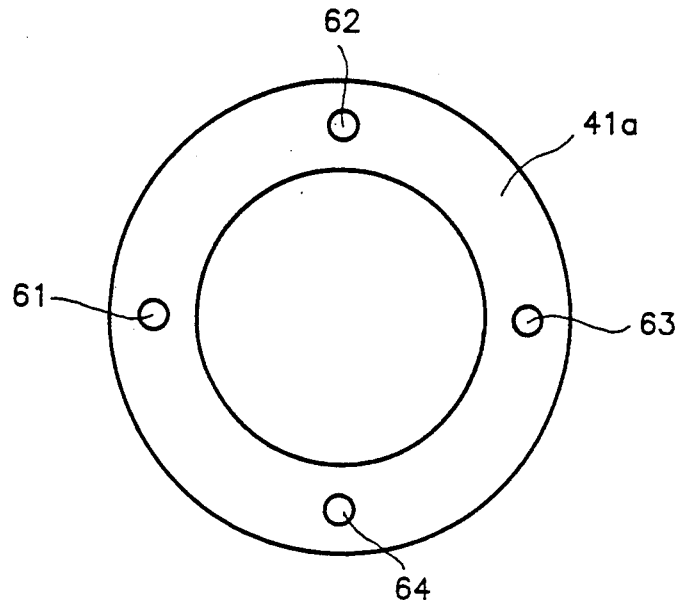
FIG. 4A is a plane view of the upper part of the measuring arm provided with a piling perpendicularity detecting unit of FIG. 1.
Figure 4B:
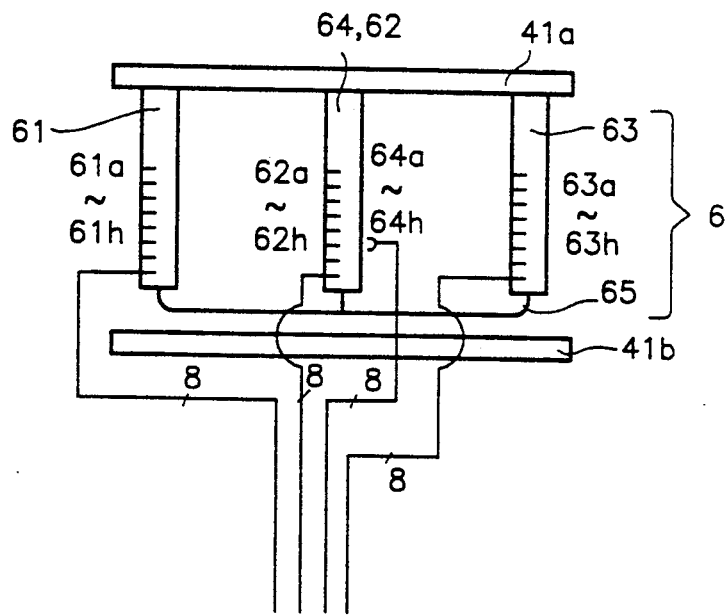
FIG. 4B is a front view of the measuring arm provided with the detecting unit of FIG. 4A.
Figure 4C:
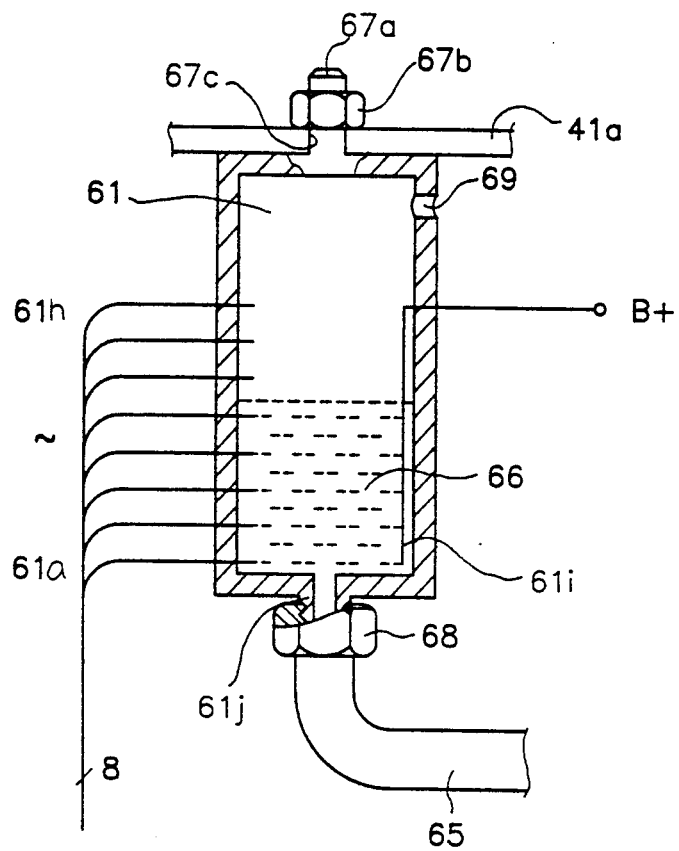
FIG. 4C is a schematic view for showing a construction of a detector of the detecting unit of FIG. 4A.

FIG. 4A is a plane view of the upper part 41a of the measuring arm 40 provided with the piling perpendicularity detecting unit 6, FIG. 4B is a front view of the arm 40 provided with the detecting unit 6, and FIG. 4C is a schematic view for showing a construction of the detecting unit 6. As shown in the drawings, the upper part 41a of the arm 40 is provided with the detecting unit 6 which comprises a plurality of cylindrical perpendicularity detectors 61 to 64. The detectors 61 to 64 are so disposed that a space is secured therebetween.

Figure 4D:
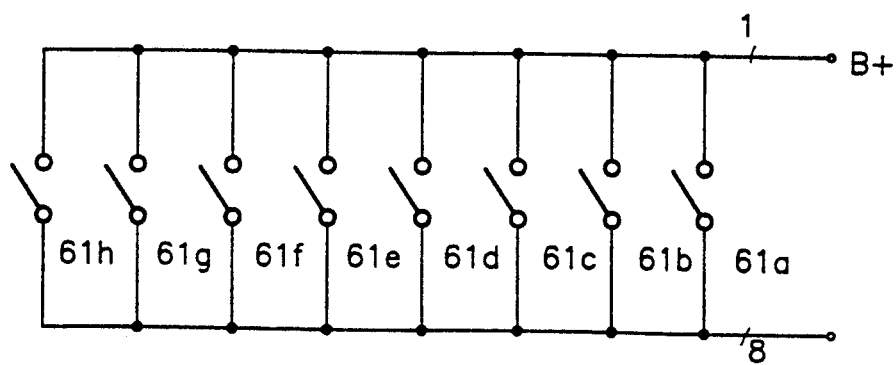
FIG. 4D is a circuit diagram showing an equivalent circuit of FIG. 4C.

The detectors 61 to 64 are equal to each other in construction and function thereof so that the following description will describe in conjunction with FIGS. 4C and 4D which each shows a detailed construction of a first detector 61. Therefore, the other detectors 62 to 64 will be efficiently referred to the following description.

As shown in FIG. 4C, the first perpendicularity detector 61 is connected to other detector 62, 63, 64 by way of a rubber hose 65 in order to communicate with the other detectors 62, 63 and 64, thereby allowing water in the detectors 61 to 64 to freely flow between the detectors 61 to 64 by way of the rubber hose 65. The hose 65 is fixedly connected to a tap 61j of the lower end of the detector 61 by means of a coupling nut 68. The perpendicularity detector 61 is downwardly mounted to the under surface of the upper part 41a of the arm 40 by means of a setting bolt 67a and a setting nut 67b, and includes a horizontal opening 69 formed at an upper side portion thereof in order to allow the inside thereof to communicate with the atmosphere. The setting bolt 67a is provided at a center portion of the upper end of the detector 61 and penetrates a hole 67c formed at the upper part 41a of the arm 40 in order to engage with the setting nut 67b.

On the other hand, the detector 61 is provided with a plurality of cathode electrodes 61a to 61h vertically and orderly disposed at a side wall of the detector 61. In addition, the detector 61 contains water 66 therein for making the cathode electrodes 61a to 61h conduct thereby. An anode electrode 61i is arranged at a bottom of the detector 61 in order to be sunk in the water 66 and applied with a source voltage B+. Referring to FIG. 4C, it is known that the water 66 is contained to a level, to which level a part of the cathode electrodes 61a to 61d are orderly disposed.

Referring next to FIG. 4D which is a circuit diagram showing an equivalent circuit of FIG. 4C, four cathode electrodes 61a to 61d conduct as the water 66 is contained in the detector 61 to the level as shown in FIG. 4C, to which level the cathode electrodes 61a to 61d are orderly disposed, thereby allowing the source voltage B+ as a perpendicularity detecting signals to be outputted from the electrodes 61a to 61d. However, the other cathode electrodes 61e to 61h do not conduct as the water is not contained to a level at which level the cathode electrodes 61e to 61h are orderly disposed as shown in FIG. 4C, so that a source voltage B+ as a perpendicularity detecting signal can not be outputted from the electrodes 61e to 61h. The source voltage B+ as the perpendicularity detecting signals outputted from the conducting cathode electrodes 61a to 61d is applied to the CPU 10. In the same manner, the other detectors 62, 63 and 64 output signals corresponding to the perpendicularity of the pile 50 to the CPU 10.

Figure 4E:
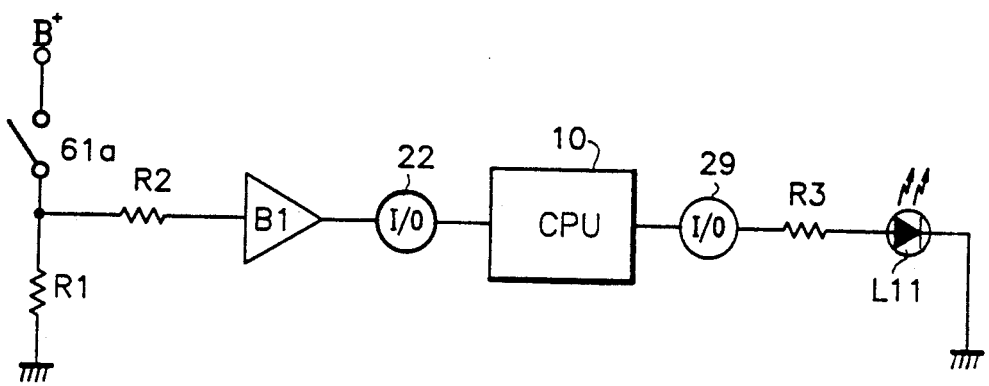
FIG. 4E is a circuit diagram showing a circuit for displaying a signal representing whether the perpendicularity of the pile is secured in accordance with this invention.

FIG. 4E is a circuit diagram showing a circuit for displaying a signal, representing whether the perpendicularity of the pile 50 is secured, outputted from the first cathode electrode 61a of the first detector 61. Referring to the circuit, the signal of the source voltage B+ is applied to the CPU 10 by way of the conducting cathode electrode 61a, a pair of resistor R1 and R2, a buffer B1 and the input/output unit 22 as the cathode electrode 61a conducts by virtue of the water 66 contained in the detector 61 to a level at which the first cathode electrode 61a is arranged. Upon receiving the input signal of the source voltage B+ outputted from the first cathode electrode 61a, the CPU 10 processes the input signal and then outputs a control signal to a light emitting diode L11 (hereinafter, referred to simply as "the LED") of the perpendicularity display 16 by way of the input/output unit 29 and a resistor R3 in order to turn on the LED L11.

Figure 4F:
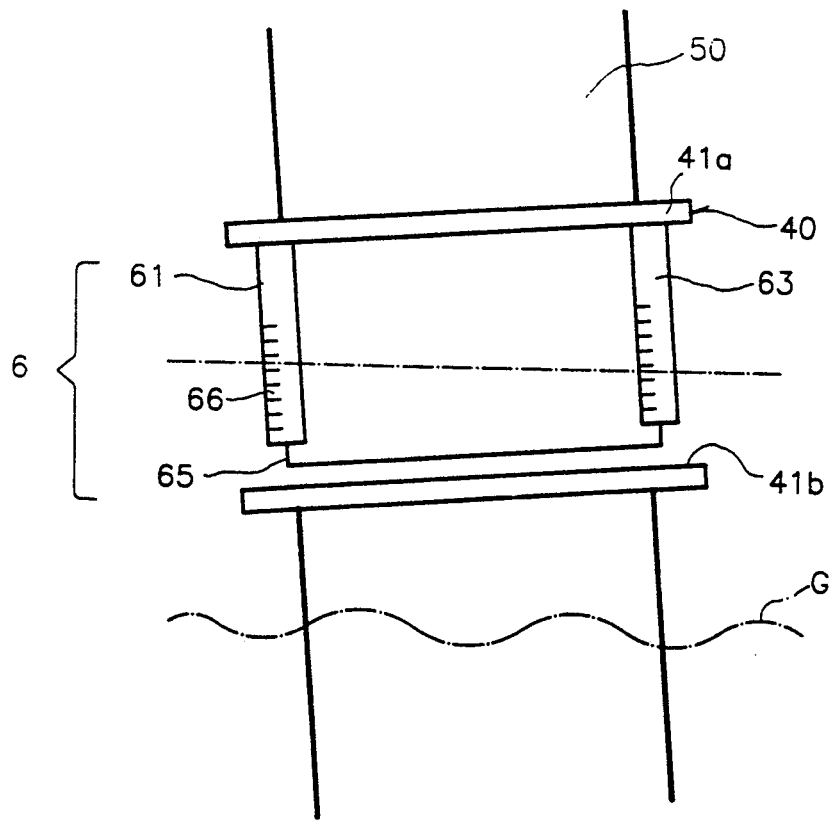
FIG. 4F is a schematic elevational view of the pile equipped with the measuring arm having the perpendicularity detecting unit of FIG. 1, but showing a state of leaning on leftward side.

Referring to FIG. 4F which is a schematic elevational view of the pile 50 equipped with the measuring arm 40 having the perpendicularity detecting unit 6, there is shown the pile 50 leaning on one side. In result, a part of the water 66 having been contained in a detector located at a relatively higher position, for example the third detector 63, flows toward another detector diametrically opposite to the detector located at the relatively higher position, for example, said another detector being the first detector 61 which is diametrically opposite to the third detector 63 and located at a relatively lower position than the third detector 63 due to the leaning of the pile 50. Accordingly, the relative water levels 135 of the detectors 61 and 63 differ from each other. Thus, the number of cathode electrodes of the detectors 61 and 63 which may conduct by virtue of the water 66 contained in the detectors 61 and 63 differs from each other because of difference between the relative water levels of the detectors 61 and 63.

Figure 5:
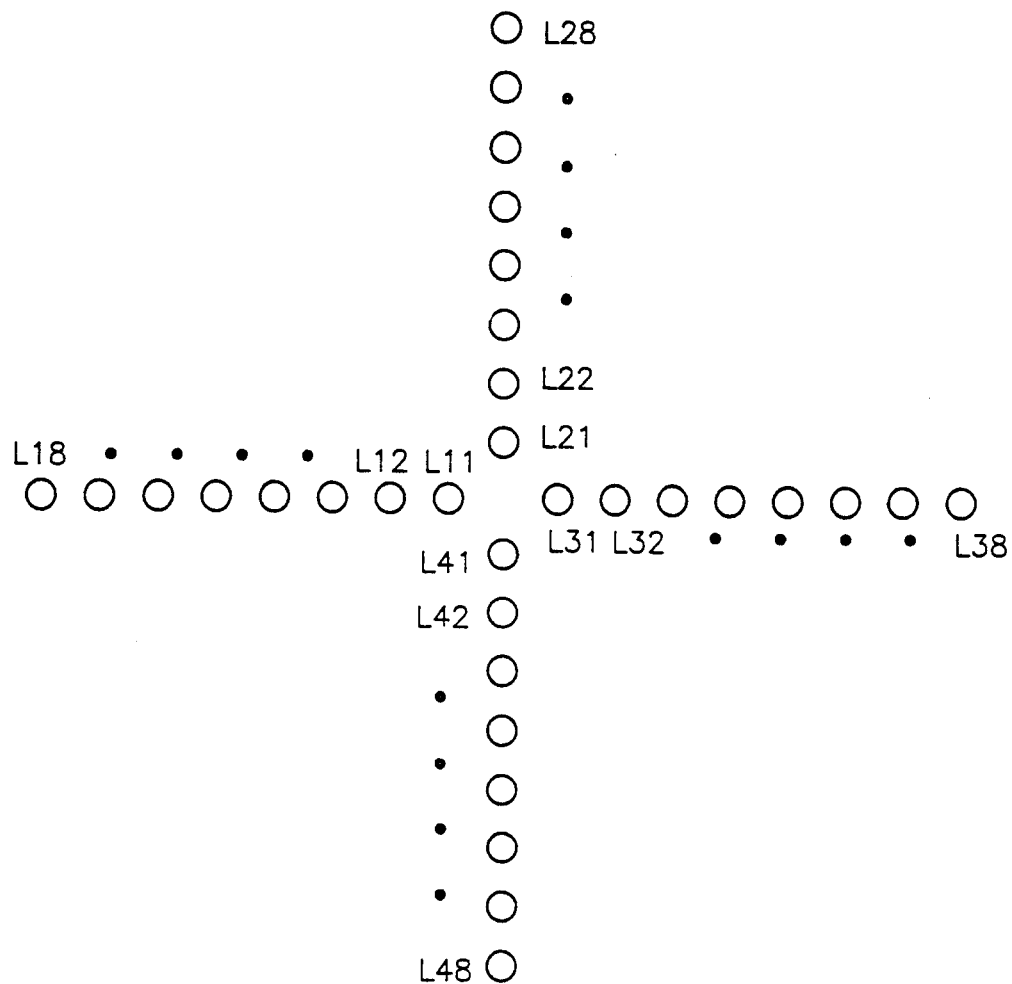
FIG. 5 is a schematic plane view showing an arranging construction of the LEDs of the perpendicularity display of FIG. 1.

FIG. 5 is a schematic plane view showing an arranging construction of the LEDs of the perpendicularity display 16. As shown in the drawing, the display 16 comprises four groups of LEDs L11 to L18, L21 to L28, L31 to L38 and L41 to L48 arranged on a plate. The LEDs of each group are orderly arranged in a vertical or horizontal straight line in order to have a space therebetween. In addition, the groups of LEDs each is radially arranged at every 90° of the plate of the display 16, thereby accomplishing a cross-shaped arrangement of the LEDs L11 to L18, L21 to L28, L31 to L41 to L48 as shown in FIG. 5. Therefore, if the pile 50 is inserted into the ground under the condition of leaning on one side as shown in FIG. 4F, a part of the cathode electrodes 61a to 61h of the first detector 61 conduct so as to turn on a part of the first group of the LEDs L11 to L18 corresponding thereto, while a part of the cathode electrodes 63a to 63h of the third detector 63 conduct so as to turn on a part of the third group of the LEDs L31 to L38 corresponding thereto. At this time, the number of LEDs L11 to L18 turned on by the conducting electrodes 61a to 61h of the first detector 61 is more than the number of the LEDs L31 to L38 turned on by the conducting electrodes 63a to 63h of the third detector 63. Thus, the perpendicularity display 16 can display whether the perpendicularity of the pile 50 is secured as the pile 50 is inserted into the ground G by means of the piling machine, thereby making it possible to alarm the operator to lean of the pile 50 in case of occurring the lean during a piling operation.

Figure 6:
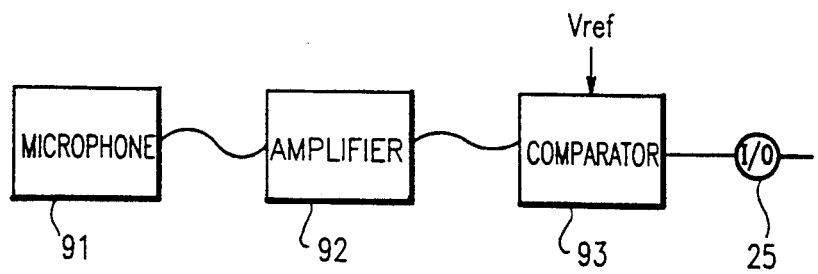
FIG. 6 is a block diagram showing a construction of the hammering sound detecting unit of FIG. 1.

Referring next to FIG. 6 which is a block diagram showing a construction of the hammering sound detecting unit 9, the unit 9 comprises a microphone 91 for receiving an outside sound such as a hammering sound and the like, then outputting a signal corresponding to the sound, a signal amplifier 92 for amplifying the sound signal outputted from the microphone 91 and a comparator 93 for comparing the amplified sound signal applied from the signal amplifier 92 thereto with a reference voltage Vref in order to output a signal, which is capable of determining whether the signal from microphone 91 is a signal representing the hammering sound, to the CPU 10 by way of the input/output unit 25.

Hereinafter, an operational effect of the system of this invention having the above-mentioned construction will be described in detail in conjunction with flowcharts shown in FIGS. 7 to 9.

First, the measuring arm 40 is mounted on the pile 50 as shown in FIG. 2C, and then the pile 50 is positioned on the ground G. Thereafter, the electric circuit of the system is turned on so that the CPU 10 outputs the waiting signal to the signal display 14 by way of the input/output unit 27 in order to turn on a waiting signal lamp of yellow color.

At this time, the operator sets a pile number, an operational date, a reference sinking amount and an average times of hammering by means of the pile numbering unit 1, the operational data setting unit 2, the reference sinking amount setting unit 3 and the average times of hammering setting unit 4, respectively. In result, respective signals corresponding to the pile number, the operational date, the reference sinking amount and the average times of hammering are outputted from the pile numbering unit 1, the operational date setting unit 2, the reference sinking amount setting unit 3 and the average times of hammering setting unit 4 to the CPU 10 by way of the input/output units 17 to 20. Thereafter, the operator pushes a start button in order to allow the start signal generating unit 8 to generate a start signal. The start signal is then outputted from the unit 8 to the CPU 10 by way of the input/output unit 24, thereby causing the CPU 10 to perform a control process shown in the flowchart of FIG. 7.

As shown in the flowchart, at a step 101 the CPU 10 first initializes variables of the system, then outputs a working signal to the signal display 14 by way of the input/output unit 27 in order to turn on a working signal lamp of blue color. At the step 101, the CPU 10 also outputs a set-up signal to the data printer 13 by way of the input/output unit 26 in order to set up the printer 13 at a waiting state, and outputs a clear signal to the displacement detecting unit 5 by way of the input/output unit 21 in order to clear the counter 54 of the detecting unit 5.

Thereafter, at a step 102 the CPU 10 receives respective signal corresponding to the pile number, the operational date, the reference sinking amount and the average times of hammering and stores therein. A signal corresponding to the perpendicularity of the pile 50 is outputted at a step 103 from the perpendicularity detecting unit 6 to the CPU 10 by way of the input/output unit 22. Upon receiving the signal corresponding to the perpendicularity, the CPU 10 outputs at a step 104 a display signal to the perpendicularity display 16 by way of the input/output unit 29 in order to cause the display 16 to display whether the perpendicularity of the pile 50 is secured. Here, if the pile 50 is vertically positioned, the measuring arm 40 will be vertically positioned. Thus, the perpendicularity detectors 61, 62, 63 and 64 of the perpendicularity detecting unit 6 have the same water level with each other. In order words, the detectors 61 to 64 each contains therein the water 66 in order to reach a level of the fourth cathode electrode 61d, 62d, 63d, 64d thereof so that each four cathode electrodes 61a to 61d, 62a, to 62d, 63a to 63d and 64a to 64d conduct by virtue of the water 66, thereby causing the source voltage B+ as the perpendicularity signal of the pile 50 to be outputted from the cathode electrodes 61a to 61d, 62a to 62d, 63a to 63d and 64a to 64d to the CPU 10 by way of the input/output unit 22. Upon receiving the source voltage B+, the CPU 10 outputs at a step 104 the display signals to the perpendicularity display 16 by way of the input/output unit 29. Therefore, the LEDs L11 to L14, L21 to 24, L31 to L34 and L41 to L44 of the display 16 are turned on in order to inform the operator of a state that the perpendicularity of the pile 50 is secured.

On the other hand, if the pile 50 is positioned in order to lean on the left side as shown in FIG. 4F, the measuring arm 40 mounted on the pile 50 also leans on the left side so that the detectors 61 to 64 lean on the left side. Hence, the water levels of respective detectors 61 to 64 may be different from each other. Here, if it is supposed that each detector 61, 62, 63, 64 contains the water 66 to a level of a cathode electrode 61e, 62d, 63c, 64d, the electrodes 61a to 61e, 62a to 62d, 63a to 63c and 64a to 64d will conduct by virtue of the water 66. In result, the source voltage B+ as the perpendicularity signal of the pile 50 is outputted from the electrodes 61a to 61e in case of the first detector 61, while it can not be outputted from the other electrodes 61f to 61h. In the same manner, the source voltage B+ is outputted from the electrodes 62a to 62d, 63a to 63c and 64a to 64d in case of the second, third and fourth detectors 62, 63 and 64, while it can not be outputted from the other electrodes 62e to 62h, 63d to 63h and 64e to 64h. Therefore, the source voltage B+ as the perpendicularity signal of the pile 50 is outputted from the perpendicularity detecting unit 6 to the display 16 by way of the CPU 10, thereby causing the LEDs L11 to L15, L21 to L24, L31 to L33 and L41 to L44 to be turned on in order to inform the operator of an occurrence of a leftward leaning of the pile 50. Thus in this case, the operator easily knows the occurrence of leftward leaning of the pile 50.

At this time, if a space D between the first and third detectors 61 and 63 is 400 mm, and a space d between respective cathode electrodes of the detectors 61 to 64 is 4 mm, the perpendicularity of the first and third detectors 61 and 63 (referred to as a perpendicularity in the X direction) and the perpendicularity of the second and fourth detectors 62 and 64 (referred to as a perpendicularity in the Y direction) will be described as follows:

1. the perpendicularity in the X direction:

$$\tan\theta = [|X_1 - X_2| \times d]/D = [2 \times 4]/400 = 1/50, \text{ and}$$

2. the perpendicularity in the Y direction:

$$\tan\theta = [|Y_1 - Y_2| \times d]/D = 0.$$

Referring again to the flowchart of FIG. 7, upon receiving a displacement detecting signal outputted from the piling displacement detecting unit 5 by way of the input/output unit 21, the CPU 10 determines at a step 105 whether the piling machine hammered the pile 50 in order to insert it into the ground. Here, the roller 52 of the rotary encoder 51 closely contacts with the outer surface of the pile 50 as described above, so that it operatively rolls as the pile 50 is inserted into the ground G by hammering of the piling machine. Thus, the rotary encoder 51 outputs a pulse signal corresponding to the rolling of the roller 52 from a detecting part 53 thereof. The pulse signal from the encoder 51 is then processed by means of the counter 54 in order to count the number of the pulses thereof, then applied to the CPU 10 by way of the input/output unit 21, thereby allowing the CPU 10 to receive the displacement data of the displacement signal. Upon comparing the displacement data, the CPU 10 easily determines whether the pile 50 was hammered by means of the piling machine.

On the other hand, a signal corresponding to an outside sound having been inputted by means of the microphone 91 is amplified by the amplifier 92, then compared with a reference voltage Vref by means of the comparator 93. At this time, the comparator 93 will output a high voltage hammering sound detecting signal in case of receiving a hammering sound generated when the piling machine hammered the pile 50. The high voltage hammering sound detecting signal is then applied to the CPU 10 by way of the input/output unit 25. Therefore, upon receiving the displacement data and the hammering sound detecting signal at a step 106 in case of hammering, the CPU 10 determines at a step 107 whether the piling operation has been optionally fabricated by a person. At this time, if a hammering sound detecting signal has not been received, even though the received displacement data shows a displacement of the pile 50, the CPU 10 determines that the piling operation has been optionally fabricated. Therefore, the CPU 10 performs a step 114 wherein it outputs a voice signal, representing that the piling operation has been optionally fabricated, to the informing speaker 15 by way of the input/output unit 28 in order to generate an alarm voice, then initializes the system.

However, if it is determined that the piling operation has not been fabricated, on the basis of the displacement data and the hammering sound detecting signal, at a step 108 the CPU 10 determines whether a hard base rock appeared. If the hard base rock appeared, the CPU outputs at a step 112 a stop signal to the signal display 14 by way of the input/output unit 27 in order to turn on a stop signal lamp of red color, and also outputs a voice signal to the speaker 15 by way of the input/output unit 28 in order to generate a voice representing the stop of the piling operation. Thereafter, at a step 113 the CPU 10 outputs result data to the printer 13 by way of the input/output unit 26 in order to print the result data according to the appearance of the hard base rock. At this time, the printer 14 prints the displacement amounts in the last two times of hammering, the operational date, the pile number and the operational result message of the appearance of the hard base rock.

On the other hand, at the step 108 if it is determined that a hard base rock does not appear, the CPU 10 divides at a step 109 the displacement data representing the result sinking amount by the set average times of hammering in order to calculate an average sinking amount, then compares the average sinking amount with a previously set reference sinking amount in order to determine whether the average sinking amount satisfies the reference sinking amount. If the average sinking amount does not satisfy the reference sinking amount as the one is larger than the other, the process returns to the step 103 wherein the CPU 10 receives the perpendicularity data. However, the average sinking amount satisfies the reference sinking amount, the CPU 10 performs a next step 110 wherein it outputs a control signal to the signal display 14 by way of the input/output unit 27 in order to turn on the stop signal lamp of red color, and also outputs a voice signal to the speaker 15 by way of the input/output unit 28 in order to generate a voice representing the operation stop. Thereafter, at a step 111 the CPU 10 outputs a result data according to the satisfaction to the printer 13 by way of the input/output unit 26 in order to print the result data. At this time, the printer 14 prints the displacement amount in the last hammering, the operational date, the pile number and the operational result message of satisfaction (OK message).

Figure 8A:
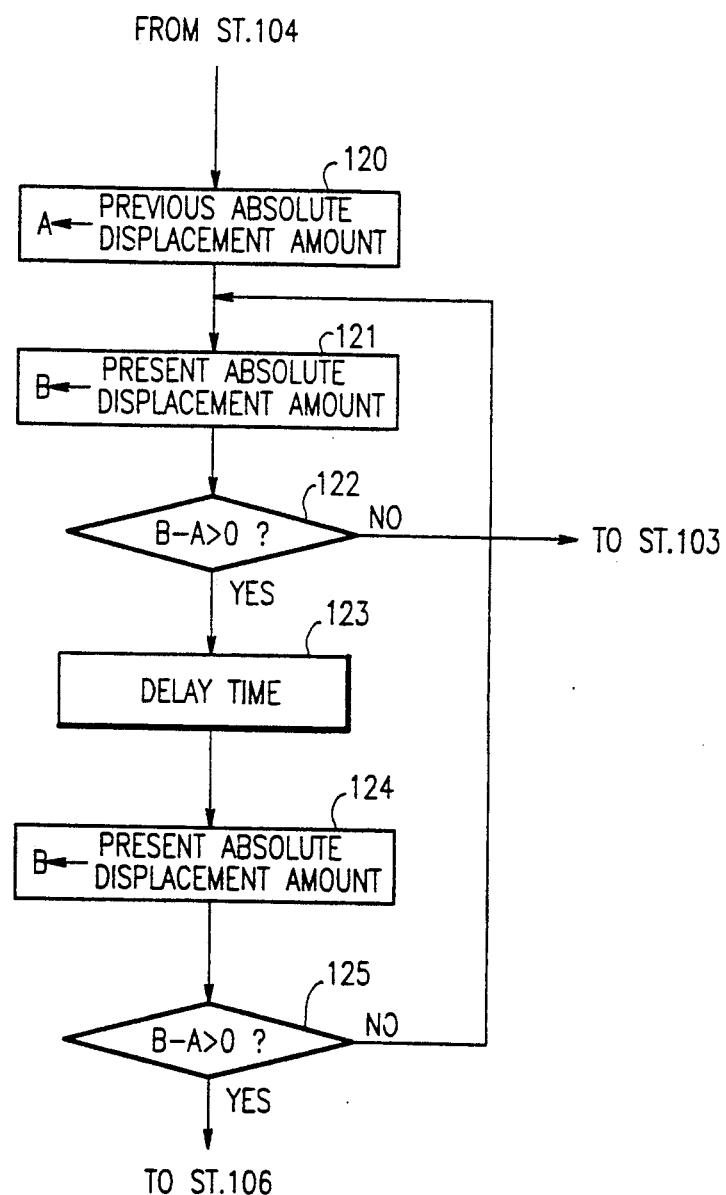
Figure 9:
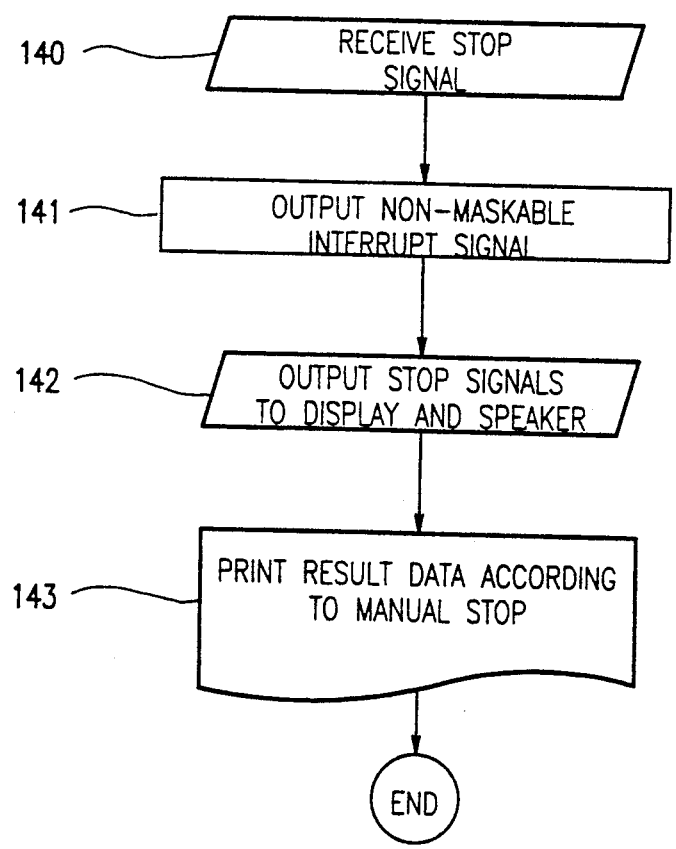

On the other hand, FIG. 8A shows a flowchart of a sub-routine for determining whether the piling machine hammered the pile 50 in order to insert it into the ground. As described in the flowchart, at a step 120 the CPU 10 stores a previous absolute displacement amount into a first register A. Also, at a step 121 the CPU 10 stores a present absolute displacement amount into a second register B. The CPU 10 then compares at a step 122 the previous and present absolute displacement amounts with each other in order to determine whether a result amount from subtracting the previous absolute displacement amount from the present absolute displacement amount is larger than zero. If the result amount is smaller than zero, so to speak, if the present amount is smaller than the previous amount, the process returns to the step 103 of the flowchart of FIG. 7 in order to receive the perpendicularity data. However, if the result amount is larger than zero, so to speak, if the present amount is larger than the previous amount, the CPU 10 performs a next step 123 in order to delay the process until a predetermined time, and store the present absolute displacement amount into the second register B. Thereafter, at a step 125 the CPU 10 again compares the previous and present absolute displacement amounts with each other in order to determine whether a result amount from subtracting the previous absolute displacement amount from the present absolute displacement amount is larger than zero, as described in the step 122. If the result amount is smaller than zero, the process returns to the step 121 in order to store the present absolute displacement amount into the register B. However, if the result amount is larger than zero, the process proceeds to the step 106 of the flowchart of FIG. 7 in order to receive the hammering sound detecting signal and the displacement data.

Figure 8B:
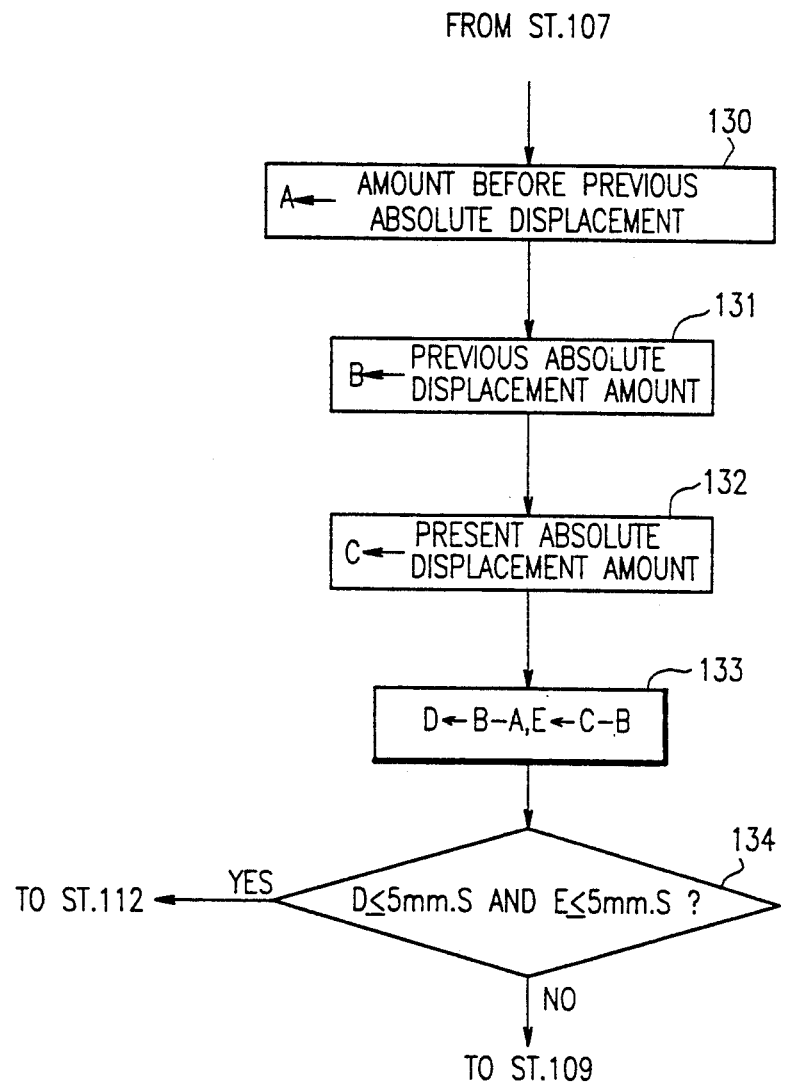

In addition, FIG. 8B shows a flowchart of a sub-routine for determining whether the hard base rock appeared. As described in the flowchart, at a step 130 the CPU 10 stores a displacement amount before the previous absolute displacement amount into the first register A. Also, at a step 131 the CPU 10 stores the previous absolute displacement amount into the second register B. Additionally, at a step 132 the CPU 10 stores the present absolute displacement amount into a third register C. Thereafter, the CPU 10 preforms a step 133 wherein the CPU 10 calculates a first result amount by subtracting the displacement amount before the previous absolute displacement amount from the previous absolute displacement amount, and a second result amount by subtracting the previous absolute displacement amount from the present absolute displacement amount. At the step 133, the CPU 10 also stores the first and second result amounts into the fourth and fifth registers D and E, respectively. Thereafter, the CPU 10 performs a step 134 wherein it is determined whether the fourth and fifth result amounts are equal to or smaller than a predetermined displacement amount of 5 mm.s, respectively. If the fourth and fifth result amounts are equal to or smaller than the predetermined amount of 5 mm.s, respectively, it is considered that a hard base rock appeared. In result, the CPU 10 performs the steps 112 and 113 of the flowchart of FIG. 7. However, if the fourth and fifth result amounts are larger than the predetermined amount of 5 mm.s, respectively, it is considered that a hard base rock does not appear. In result, the CPU 10 performs the steps 109 to 111 of the flowchart of FIG. 7.

On the other hand, if the operator pushed a stop button, the stop signal generator 7 generates a stop signal which is then applied to the CPU 10 by way of the input/output unit 23. Hence the CPU 10 performs a sub-routine for manually stopping the operation as described in a flowchart of FIG. 7.

As described in the flowchart, Upon receiving the stop signal from the stop signal generator 7 at a step 140, the CPU 10 outputs at a step 141 a non-maskable interrupt signal. Thereafter, the CPU 10 outputs a signal to the signal display 14 by way of the input/output unit 27 in order to turn on the stop signal lamp of red color, and outputs a voice signal to the speaker 5 by way of the input/output unit 28 in order to generate a voice representing the operation stop. The CPU 10 then outputs result data according to the operation stop to the printer 13 by way of the input/output unit 26 in order to cause the result data to be printed. At this time, the printer 13 prints the result data, such as the date of operation, the pile number and the namual stop of the operation.

As described above, the system for controlling a piling operation in accordance with this invention can automatically and accurately measure displacement and perpendicularity of the pile during the piling operation and display the displacement and the perpendicularity of the pile so that it exactly informs the operator of the point of time when the piling operation has to be stopped. Hence, the system of this invention provides an advantage in that it carries out the piling operation without an error, and needs no auxiliary worker such as a piling control operator for controlling the piling operation, resulting in curtailment of personnel expenditures, and also provides another advantage in that it can efficiently prevents a safety accident which may occur in manually measuring the results of the piling operation.

In additional, the system of this invention provides still another advantage in that the results of the piling operation are stored in an electronic circuit which can not be fabricated, and printed by a printer, thereby accomplishing an automatic superintendence for the piling operation. The system of this invention can visually display the perpendicularity of the pile during the piling operation so that it provides still another advantage in that the operator can easily and exactly observe the perpendicularity of the pile.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A system for automatically measuring piling results of a piling operation by a piling machine operated by an operator comprising:
   a pile numbering unit for numbering a pile;
   an operational date setting unit for setting a date when the piling operation is carried out;
   a reference sinking amount setting unit for setting a reference sinking amount of the pile;
   an average times of hammering setting unit for setting average times of hammering by a piling machine;
   a stop signal generating unit for generating a stop signal;
   a start signal generating unit for generating a start signal;
   a pile sinking displacement measuring unit for measuring a sinking displacement amount of the pile, said unit being operatively coupled with the pile;
   a pile perpendicularity detecting unit for detecting perpendicularity of the pile;
   a hammering sound detecting unit for detecting a hammering sound;
   a central processing unit (CPU) electrically connected to and being supplied with electrical signals from said pile numbering unit, said operational date setting unit, said reference sinking amount setting unit, said average times of hammering setting unit, said stop signal generating unit, said start signal generating unit, said pile sinking displacement measuring unit, said pile perpendicularity detecting unit, and said hammering sound detecting unit, for processing said electrical signals, and controlling said system;
   a data printer for printing operation data upon receiving data signals from the CPU;
   a signal display for displaying respective visual signals such as a waiting signal, a working signal and a stop signal upon receiving a control signal from the CPU;
   an informing speaker for informing the operator of information upon receiving an information signal from the CPU;
   a pile perpendicularity display for displaying perpendicularity of the pile upon receiving a perpendicularity signal from the CPU; and
   a measuring arm for mounting said pile sinking displacement measuring unit and said pile perpendicularity detecting unit.

2. A system for automatically measuring piling results of a piling operation as claimed in claim 1, wherein said measuring arm comprises upper and lower parts which are connected to each other by means of a plurality of vertical columns disposed between said upper and lower parts in order to secure a vertical space therebetween, and each upper and lower part being provided with a plurality of rollers mounted thereon, said rollers closely contacting an outer surface of the pile as the measuring arm is mounted to the pile, thereby causing the pile to move while contacting the rollers as the pile is being driven by the piling machine.

3. A system for automatically measuring piling results of a piling operation as claimed in claim 2, wherein said pile sinking displacement measuring unit comprises a rotary encoder having a roller and a detecting part, mounted on the measuring arm between said upper and lower parts of the measuring arm in order to be operatively connected to the pile as the pile moves, an elastic rubber plate elastically disposed between the upper and lower parts of the measuring arm in order to elastically and radially support said roller of the rotary encoder so that the roller closely and elastically contacts the outer surface of the pile, and a counter electrically connected to said detecting part of the rotary encoder in order to count a signal outputted from the detecting part of the rotary encoder.

4. A system for automatically measuring piling results of a piling operation as claimed in claim 1 or 2, wherein said pile perpendicularity detecting unit comprises a plurality of perpendicularity detectors containing water therein and mounted in spaced locations along the measuring arm, a rubber hose for connecting said perpendicularity detectors to each other in order to cause said water in respective detectors to freely flow between the detectors, an anode electrode arranged at a bottom of each detector submerged in the water, and applied with a source voltage, and a plurality of cathode electrodes vertically and orderly arranged at a side wall of the detectors.

5. A system for automatically measuring piling results of a piling operation as claimed in claim 4, wherein said pile perpendicularity display comprises a plurality of light emitting diodes orderly arranged in a vertical straight line and a horizontal straight line in a cross-shaped arrangement, said light emitting diodes each corresponding to each said cathode electrode of the pile perpendicularity detecting unit.

6. A system for automatically measuring piling results of a piling operation as claimed in claim 1, wherein said hammering sound detecting unit comprises a microphone for receiving an outside hammering sound and outputting a signal corresponding to said hammering sound, a signal amplifier for amplifying said signal outputted from the microphone, and a comparator for comparing the amplified signal from the signal amplifier with a reference voltage in order to output a signal, for determining whether the signal from microphone is a signal representing the hammering sound, to the CPU.

* * * * *